US 8,993,707 B2
Mar. 31, 2015

(12) United States Patent
McCormack et al.

(10) Patent No.: US 8,993,707 B2
(45) Date of Patent: Mar. 31, 2015

(54) AQUEOUS EPOXY AND ORGANO-SUBSTITUTED BRANCHED ORGANOPOLYSILOXANE EMULSIONS

(75) Inventors: Timothy McCormack, Ypsilanti, MI (US); Daniel Calimente, Saline, MI (US)

(73) Assignee: Wacker Chemical Corporation, Adrian, MI (US)

( * ) Notice: Subject to any disclaimer, the term of this patent is extended or adjusted under 35 U.S.C. 154(b) by 244 days.

(21) Appl. No.: 13/592,594

(22) Filed: Aug. 23, 2012

(65) Prior Publication Data

US 2014/0058012 A1  Feb. 27, 2014

(51) Int. Cl.
C08J 3/03 (2006.01)
C08G 77/14 (2006.01)
C08J 3/07 (2006.01)
C09D 183/06 (2006.01)
C09J 183/06 (2006.01)

(52) U.S. Cl.
CPC . C08G 77/14 (2013.01); C08J 3/07 (2013.01); C08J 2383/06 (2013.01); C09D 183/06 (2013.01); C09J 183/06 (2013.01)
USPC .................................. 528/43; 528/27; 516/53

(58) Field of Classification Search
None
See application file for complete search history.

(56) References Cited

U.S. PATENT DOCUMENTS

| 4,661,405 | A | * | 4/1987 | Greene et al. ............... 428/391 |
| 5,258,451 | A | | 11/1993 | Ohsawa et al. |
| 5,814,703 | A | | 9/1998 | Yamaya et al. |
| 6,048,910 | A | * | 4/2000 | Furuya et al. ................ 522/86 |
| 6,417,310 | B1 | * | 7/2002 | Omura et al. ................ 528/39 |
| 6,713,586 | B2 | | 3/2004 | Greene |
| 6,905,540 | B2 | * | 6/2005 | Breunig et al. ........... 106/38.2 |
| 2004/0131527 | A1 | | 7/2004 | Gottschalk-Gaudig et al. |
| 2005/0107520 | A1 | | 5/2005 | Gottschalk-Gaudig et al. |
| 2007/0166475 | A1 | * | 7/2007 | Fournier et al. ............. 427/412 |
| 2007/0213492 | A1 | | 9/2007 | Mowrer et al. |
| 2008/0096984 | A1 | | 4/2008 | Gottschalk-Gaudig et al. |
| 2011/0178207 | A1 | | 7/2011 | Gottschalk-Gaudig et al. |
| 2011/0190415 | A1 | | 8/2011 | Martin et al. |
| 2011/0201751 | A1 | | 8/2011 | Liu et al. |
| 2012/0021125 | A1 | | 1/2012 | Nakayama et al. |

FOREIGN PATENT DOCUMENTS

WO  2006058273 A2  6/2006
WO  2012058657 A2  5/2012

* cited by examiner

Primary Examiner — Marc Zimmer
(74) Attorney, Agent, or Firm — Brooks Kushman P.C.

(57) ABSTRACT

Aqueous emulsions of epoxy- and organo-substituted, branched organopolysiloxanes are prepared by emulsifying the latter in water with the aid of a dispersing agent. The emulsions are storage stable and are useful in multi-component coating, adhesive, and binder systems.

18 Claims, No Drawings

AQUEOUS EPOXY AND ORGANO-SUBSTITUTED BRANCHED ORGANOPOLYSILOXANE EMULSIONS

BACKGROUND OF THE INVENTION

1. Field of the Invention

The invention pertains to stable aqueous emulsions of epoxy- and organo-substituted branched organopolysiloxanes which retain their epoxy functionality upon storage.

2. Description of the Related Art

Epoxy-functional carbon-based polymers are widely used. In the coatings field in particular, solvent-based epoxy resins have been used to provide durable coatings. However, organic solvents have come under exceptional scrutiny, and thus aqueous emulsions of carbon-based resins such as those based on bisphenol A have been developed. These emulsions are possible due to the relatively low molecular weight of the epoxy resins used, and their relatively high polarity which assists in their dispersion. However, coatings made from such epoxy resins tend to yellow over time, and are subject to UV degradation when used outdoors. In addition, they are subject to loss of gloss, and to thermal degradation as well.

Organopolysiloxanes are highly thermally stable and stable to UV light as well. It would be desirable to combine these desirable features of organopolysiloxanes with the curing possibilities offered by incorporation of epoxy groups, and indeed, epoxy-functional organopolysiloxanes such as α,ω-bis(glycidoxypropyl)-terminated polydimethylsiloxanes are commercially available. However, these are used either neat or dissolved in organic solvent. Due to the greater hydrophobicity of the organopolysiloxane backbone, preparation of aqueous emulsions is unknown. Moreover, products prepared by curing such epoxy-functional organopolysiloxanes still do not have the thermal resistance and chemical resistance desired. Increasing the molecular weight of the organopolysiloxane component increases chemical and thermal resistance, but at the cost of requiring larger amounts of solvent. The decreased epoxy equivalent weight renders the production of hard coatings very difficult, if not impossible.

Martin et al. U.S. published application US2011/0190415A1 discloses aqueous emulsions prepared by emulsifying at least one organopolysiloxane resin containing condensable hydroxyl groups, an epoxy-functionalized organopolysiloxane fluid such as an epoxycyclohexylethyl-substituted polydimethylsiloxane, and a water-soluble, aminoalkyltrihydroxysilane or hydrolysate thereof. Upon mixing, the epoxy groups of the epoxy-functional silicone fluid react with the condensable groups, and thus the final emulsion no longer contains epoxy functionality. The compositions must be free of alkoxysilanes. The dispersed particles are able to form water resistant surfaces on masonry products, by absorption into the pores of the masonry and coalescence. The low molecular weight of the starting materials allows for a fine emulsion to be prepared, which retains its dispersion characteristics after the raw materials react in situ.

In like manner, Liu et al. U.S. published application US2011/0201751A1 discloses the preparation of organopolysiloxane resin emulsions by emulsifying epoxyalkyl-functional silanes with alkoxysilanes in water in the presence of a condensation catalyst such as triethanolamine. The result is a polymer which is condensed through both the normal elimination of alcohol from the alkoxysilane groups and condensation of silanol groups as well through the reaction of epoxy groups with silanol groups. The result is a dispersion of a highly crosslinked resin containing residual, unreacted alkoxy groups, and 1,2-dihydroxypropyloxypropyl groups, but with no residual epoxy groups. In both US2011/0190415 and US2011/0201751, the epoxy groups are no longer available for reaction.

It would be desirable to provide epoxy-functional organopolysiloxanes of relatively high molecular weight, which can subsequently be crosslinked into a variety of cured products, including hard coatings, and which are thermally and chemically stable, without the use of extensive amounts of solvent. These emulsions should retain their epoxy functionality upon storage.

SUMMARY OF THE INVENTION

It has now been surprisingly and unexpectedly discovered that stable aqueous emulsions of relatively high molecular weight epoxy-functional organopolysiloxanes may be prepared by directly emulsifying, with the aid of one or more emulsifiers or dispersing agents, branched organopolysiloxanes containing terminal and pendant Si—C bonded epoxy groups, and silicon-bonded organo groups. Despite the high organopolysiloxane content and branching, the dispersions are stable and retain their epoxy functionality. They are eminently suitable for use in two component coating and molding operations, as binders and penetrants, and other uses as well.

DETAILED DESCRIPTION OF THE PREFERRED EMBODIMENT(S)

The aqueous emulsions of the invention contain branched organopolysiloxanes which contain both epoxy groups and organo groups, preferably aryl or long chain alkyl groups, and preferably, phenyl groups. The emulsions contain one or more emulsifiers and/or dispersing solids, as more fully defined hereafter, but do not contain ingredients which will react with the epoxy groups to any significant degree, or which catalyze the self-condensation of epoxy groups or of the epoxy group with hydroxylic-containing substances, including water, the result obtained being that the emulsion retains the most substantial portion of its original epoxy group content even after storage at room temperature for extended periods of time, e.g. weeks, months, or preferably, years.

The epoxy- and organo-substituted organopolysiloxanes can be obtained by methods known in organosilicon chemistry, for example, by condensation of the appropriate hydrolysable silanes and/or organosiloxanes, or by suitable addition reactions, such as the hydrosilylation of unsaturated epoxy compounds such as allylglycidyl ether, glycidylmethacrylate, etc., by the appropriate organopolysiloxane, for example an organopolysiloxane containing, inter alia, dimethylsiloxy, methylphenylsiloxy, hydrogendimethylsiloxy, and phenylhydrogensiloxy units. Preferably, the branched organopolysiloxanes are prepared by aqueous cohydrolysis of the appropriate alkoxysilanes, with concomitant removal of alcohol which is eliminated during the condensation. The branched organopolysiloxanes preferably contain siloxy units of the formulae:

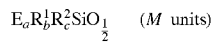 (M units)

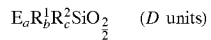 (D units)

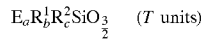 (T units)

 (Q units)

wherein

E is an epoxy-functional $C_{1-18}$ hydrocarbon group optionally containing one or more oxygen atoms, provided that no oxygen atom is directly bonded to an Si-atom; and $R^1$ and $R^2$ are independently a $C_{1-20}$ hydrocarbon, optionally interspersed with a heteroatom linking group such as, but not limited to,

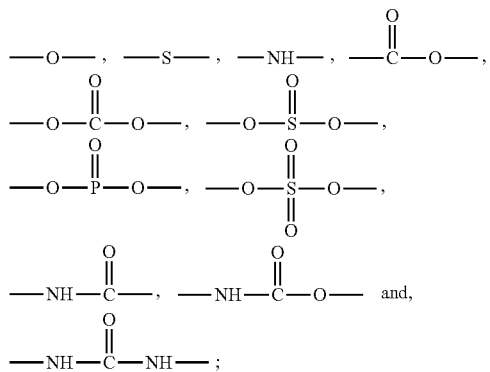

a is an integer of 0, 1, or 2, preferably 0 or 1;
b is an integer of 0, 1, 2 or 3 preferably 0, 1, or 2;
c is an integer of 0, 1, 2 or 3, preferably 0, 1, or 2; and
in M units, a+b+c=3,
in D units, a+b+c=2,
in T units, a+b+c=1, with the proviso that the molecule, on average, contain at least two E components. Preferably, at least two of $R^1$ or $R^2$ are aryl groups, for example a phenyl or naphthyl group, or long chain alkyl groups, e.g. $C_{4-20}$, preferably $C_{6-18}$, and most preferably $C_{10-18}$ alkyl groups. Aralkyl and alkaryl groups are also contemplated for $R^1$ and $R^2$.

E is preferably an epoxy-functional $C_{2-15}$ hydrocarbon group, more preferably an epoxy functional $C_{3-12}$ hydrocarbon group, and even more preferably an epoxy-functional $C_{3-6}$ hydrocarbon group. E is preferably glycidoxypropyl

Preferably, $R^1$ and $R^2$ are individually selected from among $C_{1-18}$ alkyl, $C_{6-20}$ aryl, $C_{7-18}$ alkylaryl, $C_{7-18}$ arylalkyl, $C_{5-12}$ cycloalkyl, $C_{2-18}$ alkenyl, glycol, epoxy, $C_{1-18}$ alkoxy, a $C_{2-20}$ unsaturated hydrocarbon such as vinyl, allyl, propenyl, isopropenyl, or terminal $C_{4-18}$ alkenyl, alkynyl, vinyl ether, and allyl ether groups. $R^1$ and $R^2$ may also be alkoxy groups, preferably $C_{1-4}$ alkoxy groups, and more preferably methoxy or ethoxy groups.

More preferably, $R^1$ and $R^2$ are independently selected from among ethyl, methyl, vinyl, allyl, methoxy, ethoxy, and aryl groups, e.g. phenyl and naphthyl groups. Most preferably, $R^1$ and $R^2$ are substantially all methyl and phenyl groups; all methyl, aryl, and long chain alkyl groups; or methyl and long chain alkyl groups.

If T units are present, the molecule may contain or form silsesquisiloxanes and polysilsesquioxanes from the T units.

The organopolysiloxanes may be terminated with conventional end groups, such as trialkylsilyl, dialkylsilanolyl, dialkylalkoxysilyl, alkyldialkoxysilyl, dialkylvinylsilyl, and the like. The terminal groups are preferably M groups as disclosed earlier, where a is 1, these terminal groups thus containing at least one epoxy functionality.

The epoxy- and organo-substituted organopolysiloxane preferably comprises less than about 15 mol percent Q units, and between about 3 and about 60 mol percent T units, based on the total mols of M, D, T, and Q units in the epoxy- and organo-substituted organopolysiloxane resin, more preferably, less than about 10 mol percent Q units and between about 5 and about 20 mol percent T units, yet more preferably, less than about 5 mole percent Q units and between about 5 and about 15 mole percent T units, and most preferably, the epoxy- and organo-substituted organopolysiloxane comprises T units, D units, and terminal M units, with no Q units present.

Preferably, the epoxy- and organo-substituted organopolysiloxane has an alkoxy content of less than about 20 weight percent, based on the weight of the epoxy- and organo-substituted organopolysiloxane, more preferably less than about 15 weight percent, and most preferably less than about 10 weight percent.

The epoxy- and organo-substituted organopolysiloxane is preferably a liquid having a weight average molecular weight of about 400 to about 15,000 g/mol, more preferably about 700 to about 5,000 g/mol, and most preferably about 800-1500 g/mol. The viscosity of the epoxy- and organo-substituted organopolysiloxane is preferably between about 50-70,000 cps at 25° C., more preferably 70-50,000 cps, and most preferably, 70-10,000 cps.

While the epoxy- and organo-substituted organopolysiloxane must have at least two epoxy groups per molecule, preferably the epoxy- and organo-substituted organopolysiloxane has two to eight epoxy groups per molecule. More preferably, the epoxy equivalent weight of the epoxy- and organo-substituted organopolysiloxane is in the range of about 150-1000 with the preferred range being about 200-800, more preferably 400 to 700. The organo groups of the epoxy- and organo-substituted organopolysiloxane are preferably methyl groups, and more preferably methyl and aryl groups, methyl and long chain alkyl groups, or methyl, aryl, and long chain alkyl groups. Most preferably, the aryl groups are phenyl groups. By "aryl groups" herein and in the claims is also meant to include alkaryl groups such as methylphenyl groups and aralkyl groups such as benzyl groups. The aryl groups as thus defined preferably contain from 6 to 20 carbon atoms.

Preferred epoxy- and organo-substituted organopolysiloxanes of the present invention are branched organopolysiloxanes which may be represented by the formula:

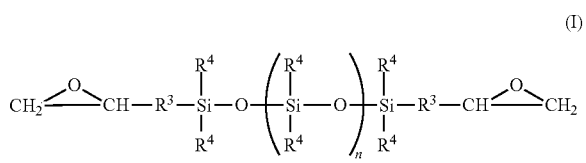

(I)

where $R^3$ are ($C_1$-$C_{18}$) alkylene groups, optionally interspersed with oxygen (provided that the oxygen is not bonded to silicon) and arylene groups; $R^4$ can be independently chosen from one of the following groups: alkyl, aryl, vinyl, glycol, alkoxy ($C_1$-$C_8$), and epoxy, and epoxy-functional or organosilyl or epoxy-functional organo(poly)siloxyl; with n being greater than or equal to 1. Preferably, at least two of $R^4$ are aryl, preferably phenyl. At least one $R^4$ must be epoxyalkyl or an Si—O—bonded silicon-containing group, providing branching in the organopolysiloxane.

The epoxy-functional organopolysiloxane resin of the present invention may be prepared by any known method and is preferably prepared by reacting an epoxy functional hydrolyzable silane (i.e., a silane having minimally at least one epoxy group per molecule) with a silicone "base" polymer, by cohydrolysis, or by hydrosilylation of an unsatured, epoxy group-containing silane with an Si—H-functional base polymer.

Suitable silicone base polymers may include M, D, T, and/or Q units as are known in the art and preferably have a molecular weight ($M_w$) from about 300 to about 15,000 g/mol, more preferably from about 1000 and 2500 g/mol, and most preferably from about 700 to about 2000 g/mol. The silicone base polymers for reaction (cohydrolysis) with epoxy-functional akoxysilanes must contain residual alkoxy groups, while those used for preparation using hydrosilylation of unsaturated epoxy-functional compounds must contain silicon-bonded hydrogen.

Particularly preferred epoxy and aryl-substituted organopolysiloxane resins are those having the formula

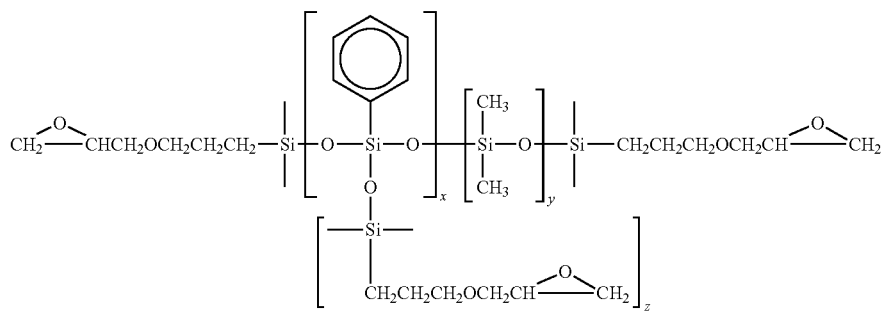

where x and y are integers which, on average, provide an epoxy equivalent weight of from 150 to 1000, preferably 200 to 800, and more preferably from 400-700. Methyl groups in the above formula may be replaced by phenyl groups, alkyl groups other than methyl groups, e.g. $C_{2-20}$ alkyl groups, or with other groups which are non-reactive with epoxy groups when in the form of an aqueous dispersion. Examples of the latter groups include, for example, haloalkyl groups, preferably fluoroalkyl groups, cyano groups, and the like. A particularly preferred epoxy and aryl-substituted organopolysiloxane is SILRES® HP 1250 available from Wacker Chemicals, and having an epoxy equivalent weight of about 660-680 and a kinematic viscosity of 90-135 cst. The "dangling bonds" in the above formula may be alkyl, aryl, or alkoxy groups. In the formula, x is preferably 0-8, more preferably 0-4, and y is 0 to 100, preferably 0 to 10, and more preferably 1-6.

Suitable epoxy functional silanes are represented by the formula:

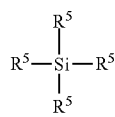

wherein $R^5$ are one of, or a combination of, the following groups alkyl ($C_{1-12}$), aryl ($C_{6-9}$), ara alkyl ($C_{4-20}$), alkaryl ($C_{4-20}$), vinyl, glycol, alkoxy ($C_{1-12}$), and an epoxy functional $C_{1-18}$ hydrocarbon group, with the proviso that at least one $R^5$ comprises $R^6$-E, where $R^6$ is an Si—C bonded hydrocarbon group, and at least one alkoxy group is present for bonding by condensation or at least one unsaturated group is present if synthesis is by hydrosilylation.

It should be noted that the $R^6$ hydrocarbon group may optionally contain interspersed oxygen atoms. $R^6$ preferably comprises a $C_{3-12}$ hydrocarbon group, and most preferably a $C_{3-6}$ aliphatic hydrocarbon group. Preferably, $R^6$-E is glycidoxypropyl

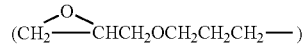

Preferably, the silane has a molecular weight from about 100 to about 750, more preferably about 150 to about 500, and most preferably about 180 to about 350. The silane preferably has an epoxy functionality of from about 1 to about 10, more preferably 1 to about 5, and most preferably about 1. The silane has an alkoxy functionality of from about 1 to about 10, more preferably 1 to about 5, and most preferably about 3, when it is desired to synthesize by condensation. The term "silane" as used herein also includes partial hydrolysates of condensable silanes. Preferably, the silanes are monosilanes.

Preferably, the silane is a γ-glycidoxypropylsilane having $C_{1-18}$ alkoxy groups bonded to silicon. A preferred silane is γ-glycidoxypropyltrimethoxysilane (OSi, A187). Most preferably, the silane is γ-glycidoxypropyltriethoxysilane (Wacker GF-82). The use of such glycidoxypropyltrialkoxysilanes will incorporate covalently bonded epoxy functionality without having a hydrolysable Si—O—C bond. It is highly preferred that the epoxy group-containing moieties are Si—C bonded, thus avoiding the possibility of hydrolysis due to the presence of Si—O—C bonding.

The condensation reaction of the silicone base polymer and the epoxy functional silane takes place in water, as is known in the art. Preferably, a sufficient amount of water is provided to result in an alkoxy content of less than about 20 weight percent, more preferably less than about 15 weight percent, and most preferably 10 weight percent or less. Preferably, substantially no residual alkoxy groups remain.

The epoxy- and organo-group-containing organopolysiloxanes are preferably produced by cohydrolysis of the respective alkoxy silanes. The epoxy- and organo-substituted organopolysiloxanes are preferably branched through the inclusion of T and Q units as branch sites. Alternatively, some or all of the branch sites may consist of Si—C-bonded epoxy groups pendant to the polymer chain. An example of such a synthesis is included herein as Example 1, and in U.S. Pat. No. 6,713,586 and U.S. Pat. No. 5,814,703 which are incorporated herein by reference.

In an alternative method of preparation briefly described previously, the epoxy- and organo-substituted silicone may be prepared by hydrosilylation. In a first step, a base organopolysiloxane, which may be linear or branched, and which contains Si-bonded organo groups, preferably phenyl groups, Si-bonded hydrogen, and preferably Si-bonded methyl groups, is provided. Such organopolysiloxanes are available commercially or may be prepared by methods customary in organopolysiloxane chemistry. For example, the base organopolysiloxanes may be prepared by cohydrolysis of the appropriate hydrolyzable silanes, for example but not by limitation, a mixture of a plurality of dimethyldimethoxysilane, methylphenyldimethoxysilane, hydrogenmethyl-dimethoxysilane, hydro genphenyldimetho xysilane, phenyltrimethoxysilane, methyltrimethoxysilane, isooctyltrimethoxysilane, hydrogendimethylmethoxysilane, and the like, to provide an organopolysiloxane which is linear or branched, and which preferably contains at least two silicon-bonded aryl groups or long chain alkyl groups, preferably a higher plurality of such groups, and at least two silicon-bonded hydrogen atoms, preferably two or more terminal groups bearing silicon-bonded hydrogen and on-chain silicon-bonded hydrogen atoms as well. The cohydrolysis may be of methoxy-functional silanes as indicated, or other alkoxy silanes such as their ethoxy or propoxy analogues. Use of methoxysilanes, ethoxysilanes, and mixtures thereof is preferred. In lieu of alkoxysilanes, the corresponding halosilanes such as dimethyldichlorosilane, etc., may also be used.

In addition to preparation by cohydrolysis of silanes, equilibration methods may be used to prepare the Si—H functional base polymer. In such methods, a first organopolysiloxane is admixed with other silicon compounds desired to be incorporated into the base organopolysiloxane. Thus, for example, a polydimethylsiloxane also containing phenyl groups may be equilibrated with tetramethylcyclotetrasiloxane to introduce silicon-bonded hydrogen into the organopolysiloxane. Equilibration is well known, and may take place in the presence of basic equilibration catalysts such as sodium hydroxide, sodium methoxide, potassium hydroxide, etc., or with other equilibration catalysts such as phosphonitrilic acid chlorides.

The Si—H-containing base organopolysiloxane, generally washed and purified to remove catalysts and optionally low molecular weight materials, is used to hydrosilylate an unsaturated epoxy compound such as allylglycidyl ether, 3,4-epoxy-1-cyclohexene, 1,2-epoxy-9-decene, glycidylacrylate, glycidylmethacrylate, or the like, in the presence of a hydrosilylation catalyst. Conventional noble metal catalysts, preferably platinum catalysts such as, but not limited to, hexachloroplatinic acid, Karstedt's catalyst, etc., may be used. As a result of the hydrosilylation, epoxy group-containing moieties become bonded to the organopolysiloxane base polymer through carbon-carbon bonds.

The aqueous emulsions of the present invention contain one or more emulsifiers and/or dispersing solids and may also contain additional, non-reactive ingredients. By the term "non-reactive" is meant that the additional ingredients do not react substantially with epoxy groups in the aqueous emulsion at room temperature. Preferably, such ingredients do not display any reactivity to epoxy groups in the aqueous emulsions at room temperature, and preferably exhibit no reactivity at elevated temperature storage conditions of up to 50° C. Reactivity may easily be assessed by preparation of an aqueous emulsion and observing its properties over time. Coagulation of the emulsified particles is one sign that significant reaction has occurred. In addition, the epoxy group content may be measured by $^1$H NMR or other methods, or the curability of the emulsion, when admixed with a traditional curing agent such as an anhydride or polyamine may be assessed. The emulsifier (surfactant) and dispersing solids, if present, are also unreactive as explained above.

The epoxy- and organo-substituted organopolysiloxane content of the aqueous emulsions may vary over a wide range, and preferably may be, for example, from 5 weight percent to 70 weight percent based on the weights of water, emulsifier and/or dispersing agent, and organopolysiloxane, more preferably 10 to 60 weight percent, yet more preferably 20 to 60 weight percent, still more preferably 30 to 55 weight percent, and most preferably about 40 to about 50 weight percent. The amounts of surfactants and/or dispersing solids utilized are such that an emulsion stable to separation and preferably stable with respect to creaming is obtained, and are dependent principally upon the weight percent of organopolysiloxane emulsified, lower amounts of surfactants generally being required at lower solids content. The amount of surfactant is also dependent upon the presence of other dispersion-stabilizing substances which, while being essentially inorganic in nature, serve to assist in emulsification. Among these "dispersing solid" substances are partially silylated inorganic oxides such as the partially silylated silicas and mixtures of both hydrophilic and hydrophobic metal oxides, as disclosed in U.S. patent publications 2004/0131527 A1; 2005/0107520 A1; 2008/0096984 A1; and 2011/0178207 A1, the disclosures of which are incorporated herein by reference. In some cases, these dispersing solids may take the place of traditional emulsifiers.

The process for producing dispersions can be carried out continuously or discontinuously. Preferably, the organopolysiloxanes required for preparing the dispersion are prepared and forwarded to the emulsifying apparatus and, before emulsification, are mixed with emulsifiers and/or some of the water as the dispersion medium and this mixture is fed to a high-shear mixer whereupon a viscous phase is formed in the mixer, the pressure and temperature downstream of the mixer being measured and closed-loop controlled such that a stable and very finely divided dispersion is produced. Further materials can be added upstream or downstream of the first high-shear mixer. If appropriate, the emulsion downstream of the first high-shear mixer can be further diluted by admixture of water. Other methods of preparing emulsions may also be used.

The process of the present invention may utilize as emulsifiers any ionic and nonionic emulsifiers (not only individually but also as mixtures of different emulsifiers) by the use of which oil-in-water dispersions, are obtainable. By the term "emulsifiers" in the context of the invention is meant organic emulsifiers. As indicated previously, the particular emulsifier or emulsifier combination, including the case where dispersing solids are employed, should be essentially unreactive with the epoxy groups contained in the epoxy- and organo-substituted, preferably phenyl-substituted organopolysiloxane.

Examples of Anionic Emulsifiers are:
1. Alkyl sulfates, particularly those having a chain length of 8 to 18 carbon atoms, alkyl and alkaryl ether sulfates having 8 to 18 carbon atoms in the hydrophobic radical and 1 to 40 ethylene oxide (EO) or propylene oxide (PO) units.
2. Sulfonates, particularly alkyl sulfonates having 8 to 18 carbon atoms, alkylaryl sulfonates having 8 to 18 carbon atoms, taurides, esters and monoesters of sulfosuccinic acid with monohydric alcohols or alkylphenols having 4 to 15 carbon atoms; if appropriate, these alcohols or alkylphenols may also be ethoxylated with 1 to 40 EO units.

3. Alkali metal and ammonium salts of carboxylic acids having 8 to 20 carbon atoms in the alkyl, aryl, alkaryl or aralkyl radical.
4. Phosphoric partial esters and their alkali metal and ammonium salts, particularly alkyl and alkaryl phosphates having 8 to 20 carbon atoms in the organic radical, alkyl ether or alkaryl ether phosphates having 8 to 20 carbon atoms in the alkyl or alkaryl radical and 1 to 40 EO units.

Examples of Nonionic Emulsifiers are:
5. Polyvinyl alcohol still having 5 to 50% and preferably 8 to 20% of vinyl acetate units and a degree of polymerization in the range from 500 to 3000.
6. Alkyl polyglycol ethers, preferably those having 3 to 40 EO units and alkyl radicals of 8 to 20 carbon atoms.
7. Alkyl aryl polyglycol ethers, preferably those having 5 to 40 EO units and 8 to 20 carbon atoms in the alkyl and aryl radicals.
8. Ethylene oxide/propylene oxide(EO/PO) block copolymers, preferably those having 8 to 40 EO and/or PO units.
9. Addition products of alkylamines having alkyl radicals of 8 to 22 carbon atoms with ethylene oxide or propylene oxide.
10. Fatty acids having 6 to 24 carbon atoms.
11. Alkylpolyglycosides of the general formula R*—O—$Z_o$, where R* is a linear or branched, saturated or unsaturated alkyl radical having on average 8-24 carbon atoms and $Z_o$ is an oligoglycoside radical having on average o=1-10 hexose or pentose units or mixtures thereof.
12. Natural materials and their derivatives, such as lecithin, lanolin, saponines, cellulose; cellulose alkyl ethers and carboxyalkylcelluloses whose alkyl groups each have up to 4 carbon atoms.
13. Linear organo(poly)siloxanes containing polar groups, containing in particular the elements O, N, C, S, P, Si, particularly those linear organo(poly)siloxanes having alkoxy groups with up to 24 carbon atoms and/or up to 40 EO and/or PO groups.

Examples of Cationic Emulsifiers are:
14. Salts of primary, secondary and tertiary fatty amines having 8 to 24 carbon atoms with acetic acid, sulfuric acid, hydrochloric acid and phosphoric acids.
15. Quaternary alkyl- and alkylbenzeneammonium salts, in particular those whose alkyl groups have 6 to 24 carbon atoms, particularly the halides, sulfates, phosphates and acetates.
16. Alkylpyridinium, alkylimidazolinium and alkyloxazolinium salts, in particular those whose alkyl chain has up to 18 carbon atoms, specifically the halides, sulfates, phosphates and acetates.

Useful Ampholytic Emulsifiers Include in Particular:
17. Amino acids with long-chain substituents, such as N-alkyldi(aminoethyl)glycine or N-alkyl-2-aminopropionic acid salts.
18. Betaines, such as N-(3-acylamidopropyl)-N,N-dimethyl-ammonium salts having a $C_8$-$C_{18}$-acyl radical and alkylimidazolium betaines.

Preference for use as emulsifiers is given to nonionic emulsifiers, in particular the alkyl polyglycol ethers recited above under 6. It is preferably that at least one nonionic surfactant with an HLB of 12 or more, preferably 14 or more be used, optionally in conjunction with other surfactants, particularly with additional nonionic surfactants having HLBs less than 12, preferably less than 10. When acidic emulsifiers are used, these are preferably used in the form of their ammonium or metal salts, for example their sodium, potassium, magnesium, or calcium salts.

Polymer particles may also be present in the emulsions. Preferred polymer particles are the so-called water-redispersible polymer powders prepared by emulsion polymerization of vinyl monomers followed by spray drying in the presence of a surfactant and/or protective colloid spraying aid which prevents irreversible agglomeration and coalescence during spray drying. Among such water-redispersible polymer powders are those prepared by polymerizing vinyl chloride; vinyl chloride and ethylene; vinyl acetate; vinyl acetate and ethylene; styrene and butyl(meth)acrylate; vinyl acetate and higher vinyl esters, optionally with ethylene; and the like. Numerous comonomers and auxiliary monomers may be included, but it is generally inadvisable to incorporate additional monomers which contain carboxylic acid groups, anhydride groups, amino groups, and tertiary amino groups, since these may cause premature reaction of the epoxy- and aryl-substituted organopolysiloxane. Any polymer solids should be essentially unreactive with the epoxy- and organo-substituted organopolysiloxane. In any case, any individual polymer's suitability can be assessed by measuring the epoxy content of the emulsion over time.

The inventive emulsions may also contain other organosilicon compounds. Among these are organopolysiloxanes, particularly polydimethylsiloxanes and polydimethylsiloxanes having some methyl groups replaced by phenyl or other organo groups; and organopolysiloxanes bearing functional groups which do not significantly react with the epoxy group of the epoxy- and organo-substituted organopolysiloxane in the aqueous emulsion, for example unsaturated groups such as vinyl and (meth)acryloyl groups, ω-alkenyl groups, urethane groups, urea groups, silicon-bonded alkoxy groups, cyano groups, and the like. Also suitable as additives are alkoxysilanes and alkylalkoxysilanes. Isooctyltriethoxysilane, for example, may be added to increase water repellency. Non-functional organopolysiloxanes may serve as plasticizers, internal mold release agents, and exudable lubricating agents, for example.

Epoxy-functional silanes such as glycidoxypropyltrimethoxysilane and glycidoxypropyltriethoxysilane may also be added, in particular to increase the crosslinking density of cured products produced from the emulsion.

The emulsion may also contain ingredients such as silicone, polyester, and acrylic-based flow additives, generally in amounts less than 8% by weight relative to the total weight of the emulsion, preferably less than 5% by weight, and more preferably less than 3% by weight.

The emulsions may, when desired, also contain pigment(s). The pigments, when present, are preferably of low particle size, and are preferably dispersed into the organopolysiloxane component prior to its emulsification in the aqueous phase, such that upon evaporation of the aqueous phase, followed by coalescence and curing, the pigment is uniformly dispersed in the cured product, for example as a cured, pigmented coating. Dyes may also be present, particularly oil soluble dyes.

Suitable pigments may be selected from organic and inorganic color pigments which may include titanium dioxide, carbon black, lampblack, zinc oxide, natural and synthetic red, yellow, brown and black iron oxides, toluidine and benzidine yellow, phthalocyanine blue and green, and carbazole violet, and extender pigments including ground and crystalline silica, barium sulfate, magnesium silicate, calcium silicate, mica, micaceous iron oxide, calcium carbonate, zinc powder, aluminum and aluminum silicate, gypsum, feldspar and the like. The amount of pigment that is used to form the composition is understood to vary, depending on the particular composition application, and can be zero when a clear composition is desired. The pigment is typically added to the epoxy- and organo-substituted organopolysiloxane and may be dispersed with a Cowles mixer, for example to at least a 3 Hegman fineness of grind, or alternatively may be ball milled or sand milled to the desired fineness of grind.

The inventive emulsions may also contain organic solvents, although this is not preferred. The organic solvents may serve as film-forming enhancers, and may be present in the organopolysiloxane dispersed phase, the continuous aqueous phase, or both. Solvents which are not overly environmentally suspect are particularly preferred. These include ethanol, isopropanol, acetone, methylethylketone, and tertiarybutylacetate. When present, organic solvents constitute less than 20% by weight of the emulsion, preferably less than 10% by weight, and more preferably less than 5% by weight. Most preferably, the emulsions are free of organic solvent, which should also be construed to mean containing organic solvent only to the extent which is essentially unavoidable during preparation of the various components, for example, traces of methanol and/or ethanol from the cohydrolysis of alkoxysilane starting materials.

The emulsions are preferably basic, more preferably with a pH of from 7 to 11, yet more preferably from 7.5 to 10.5, and most preferably from 8-9. Adjustment of pH may be made from choice of surfactant and other additives, by the addition of bases such as ammonium hydroxide or sodium or potassium hydroxide, or basic substances such as basic salts of weak acids, e.g. sodium or potassium carboxylates such as sodium acetate or potassium propionate, etc.

The emulsions may contain one or more biocides. Suitable biocides are well known. A preferred biocide is 2-((hydroxymethyl)amino)-2-methyl-1-propanol, commercially available as Troysan 192 and Mergal 192 from Troy Corporation. Other biocides are also effective, for instance tebuconazole and other triazole biocides, oxathiazolinone biocides, etc. The amount of biocide is generally the minimal amount required to bestow stability against microorganism growth, preferably less than 5% by weight relative to the total weight of the composition, and more preferably within the range of 0.1 weight percent to 2 weight percent.

The aqueous epoxy- and organo-substituted organopolysiloxane emulsions have numerous uses, including adhesives, paints, coatings, binders for polymer and hydraulically settable mineral compositions such as stuccos, plasters, renders, screens, tile adhesives, etc., and as impregnants for porous materials such as leather, wood, architectural coatings, cement, and the like. They may also be used as impregnants or coatings on woven and non-woven textiles, and as sizing agents for fibers, yarns, and fiber tows. This list is illustrative and not limiting.

In general, the aqueous emulsions of the present invention must be cured. Cure may be accomplished through the aid of conventional epoxy resin curing agents (hardeners), or may be catalyzed only, for example by tertiary amine catalysts, resulting in condensation of epoxy groups.

Preferred hardeners include, but are not limited to, any one or a combination of the following: acids, for example, phosphoric acid; amines such as aliphatic amines; aliphatic amine adducts; polyamidoamines; cycloaliphatic amines and cycloaliphatic amine adducts; aromatic amines; alkyl amines with at least one reactive hydrogen; polyalkylenepolyamines; Mannich bases; ketimines, and hydroxyl groups of reacted epoxy on siloxane polymers; mercapto-phosphor-containing compounds, and compounds bearing carboxylic acid groups and/or carboxylic acid anhydride groups. A preferred hardener component comprises a difunctional amine, i.e., an amine having two active hydrogens, which may be substituted wholly or in part with an aminosilane having the general formula:

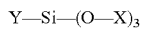

where Y is $H(HNR^7)_a$, where a is from 1 to about 8, and where "a" is equal to one, each $R^7$ is a difunctional organic radical independently selected from among aryl, alkyl, dialkylaryl, alkoxyalkyl, and cycloalkyl radicals, and where $R^7$ can vary within each Y molecule. Each X can be the same or different, and is limited to alkyl, hydroxyalkyl, alkoxyalkyl and hydroxyalkoxyalkyl groups containing less than about six carbon atoms. At least about 0.5 to about 1.2, and preferably about 0.7 equivalents of amine or about 0.05 to about 0.5, and preferably about 0.4 moles of aminosilane per equivalent of epoxy may be present in the hardener component when amino-functional hardeners are used.

Preferred aminosilanes include, but are not limited to: amino ethylaminopropyltriethoxysilane, N-phenylaminopropyltrimethoxysilane, trimethoxysilylpropyl diethylene triamine, 3-(3-aminophenoxy)propyl trimethoxy silane, amino ethylaminomethylphenyltrimethoxy silane, 2-amino ethyl-3-aminopropyltris[2 ethylhexy]silane, and N-aminohexylaminopropyltrimethoxysilane.

Other preferred aminosilanes are difunctional silanes that include aminopropyl units. A difunctional aminosilane is desired because it has been found that the combination of an aminosilane having a reactivity of two, i.e., having only two amine hydrogens, reacts with the non-aromatic epoxy, also having a reactivity of two, to form a substantially linear epoxy polymer that displays improved weatherability, with a degree of crosslinking established by the number of epoxy groups contained in the epoxy- and organo-substituted organopolysiloxane. Thus, the degree of crosslinking may range from substantially no crosslinking to a very high crosslink density. Also suitable are organopolysiloxanes bearing aminoalkyl substituents, either at the chain termini, along the polysiloxane chain, or at both locations. Such an organopolysiloxane is available commercially as SILRES® HP-2000 from Wacker Chemicals.

Such preferred amines and aminosilanes produce epoxypolysiloxane compositions that, when applied as a substrate coating, exhibit superior weatherability in terms of both color and gloss retention. Specific examples of preferred aminosilanes include Wacker Chemicals GF 80 and GF 82, Dow 6020, OSi A1100, OSiA1110, OSiA1120, OSiA 1130, OSi A1387, and Y9632.

When hardeners are used, catalysts may also be added to accelerate the reaction between the epoxy groups of the organopolysiloxane and the hardener. Such catalysts are well known, and are used in catalytic amounts effective to accelerate the cure of the composition. Suitable catalysts include hydrochloric acid, (HCl), sulfuric acid ($H_2SO_4$) and potassium hydroxide (KOH). Examples of other suitable catalysts include compounds containing aluminum, zinc, manganese, zirconium, titanium, cobalt, iron, lead and tin, for example organotin catalysts such as dibutyltin dilaurate and dibutyltin diacetate, organotitanates, sodium acetate, and amines such as aliphatic secondary or tertiary amines including propylamine, ethylaminoethanol, triethanolamine, triethylamine, methyldiethanolamine, imidazoles, and polyamines. The catalysts may be used alone or in combination.

Numerous methods of cure may be adopted. For example, the inventive aqueous epoxy- and organo-substituted organopolysiloxane emulsion may first be applied into a mold or onto a substrate followed by the hardener and/or catalyst, optionally also in the form of an aqueous emulsion, or the hardener and/or catalyst may be applied first, followed by the inventive emulsion. Alternatively, the hardener and/or catalyst may be added neat, in solution, or as an emulsion or dispersion into the inventive epoxy- and organo-substituted organopolysiloxane, and blended, preferably homogenously. The resulting mixture may contain separate dispersed phases of epoxy- and organo-substituted organopolysiloxane and hardener and/or catalyst, or the hardener and/or catalyst may be absorbed by the dispersed epoxy- and organo-substituted organopolysiloxane phase. Upon admixture, the mixture will have a limited pot life. The cure rate will be higher as the solids content of the emulsion increases, particularly upon removal of the aqueous phase. The hardener and/or catalyst should be selected in type and amount to provide the desired pot life. for substrates which can be heated, latent catalysts can be used, and such are commercially available.

A preferred use of the inventive emulsions is as a two component composition, the inventive emulsion, together with optional (essentially non-reactive) ingredients comprising a first component, and the second component comprising a solution, emulsion or dispersion containing hardener and/or catalyst, which are mixed just prior to use. Such two component systems are eminently suitable for use as binders and adhesion promoters for hydraulically settable compositions such as tile adhesives and grouts, or as paints or coatings. The latter may be applied by any useful method, including dipping, brushing, rolling, spraying, or combination of these and/or other methods. The mixed components, being aqueous, can be used as the source of water for mixing with cements, mortars, plasters, and the like.

The cured products have outstanding thermal and UV stability. This stability may be increased yet further by employing hardeners which themselves are silicone-based. UV and thermal stabilizers may also be added.

Having generally described this invention, a further understanding can be obtained by reference to certain specific examples which are provided herein for purposes of illustration only and are not intended to be limiting unless otherwise specified.

Resin Formulation Example

Methylphenyldimethoxysilane, in an amount of 60.90 grams, is blended with 167.43 grams of phenyltrimethoxysilane, 21.67 grams of dimethyldimethoxysilane, and 24.88 grams of di-ionized water in a three necked round bottom flask and mixed until homogeneous. 1.37 grams of a 19% solution of KOH is added to the mixture. The mixture is heated to 80° C. and held until 79.22 grams (101.5 ml) of alcohol is collected.

186.53 grams of γ-glycidoxypropyltriethoxysilane and 17.13 grams of de-ionized water are blended into the above reaction product and mixed until homogeneous. The resulting mixture is heated to 80° C. and refluxed until 70.19 grams (90.75 ml) of alcohol are collected. The final product is a yellow liquid with a viscosity, which is approximately 18,590 cps using a Brookfield viscometer with a spindle #6 at 20 rpm. The solids content of the solution is 93.11% by weight after reaction of the residual alkoxy groups. The alkoxy content of the resin is about 13%. The epoxy equivalent weight is about 492.

Emulsion Preparation:

Emulsions were prepared by the inverse emulsion technique of first preparing a water-in-oil emulsion, followed by gradual addition of water with intensive mixing to invert the emulsion into an oil-in-water emulsion.

EXAMPLE 1

32 g water and 24 g Tergitol® 15-S-15 nonionic surfactant were added to a 1000 ml beaker and mixed with an Ultra-Turrax® model T50 mixer until homogenous, about 2-3 minutes at 6000 $s^{-1}$. 176 g of an epoxy- and aryl-substituted polydimethyl siloxane having an epoxy equivalent weight of 660-680 g/mol epoxy groups and a kinematic viscosity of 90-135 cst, available from Wacher Chemical Corp. as SIL-RES® HP1250 was added rapidly with continued stirring at 6000 $s^{-1}$ until uniform. 40 g water was then added rapidly with continued stirring and mixed for 2-3 minutes. The preceding step was repeated twice, followed similarly by a final addition of 48 g water. The resulting oil-in-water emulsion contained 6 weight percent surfactant, 44 weight epoxy- and aryl-substituted organopolysiloxane, and 50% water. An opaque emulsion having a viscosity of 35/30 cps was obtained, as measured by a RVT Brookfield viscometer at 6/60 rpm with a #2 spindle at 25° C. Test results on the emulsion are presented in Table 1. The epoxy content of the dispersed phase was measured after 4 months and was found to be unchanged. The emulsion had a pH between 8 and 9.

EXAMPLE 2

The procedure of Example 1 was followed, but with 4.8 weight percent surfactant and correspondingly less SIL-RES® HP1250, to provide a 40% solids (organopolysiloxane plus surfactant) emulsion. The results are presented in Table 1.

EXAMPLE 3

The procedure of Example 1 was followed, using 6.0 weight percent of a blend of Tergitol® 15-S-15 and Tergitol® 15-S-30, the blend having an HLB of ca.16.1. The results are presented in Table 1. The viscosity, measured as in Example 1, was 121/420 cps.

EXAMPLE 4

The procedure of Example 2 was followed, employing the surfactant blend from Example 3. The results are presented in Table 1.

EXAMPLE 5

The procedure of Example 1 was followed, but using ARLYPON® IT-16 as the surfactant. The results are presented in Table 1.

EXAMPLE 6

The procedure of Example 2 was followed, but using ARLYPON® IT-16 as the surfactant. The results are presented in Table 1.

| | Example | | | | | |
|---|---|---|---|---|---|---|
| | 1 | 2 | 3 | 4 | 5 | 6 |
| Surfactant | 15-S-15 | 15-S-15 | I5-S-15/15-S-30 | I5-S-15/15-S-30 | IT16 | IT16 |
| % Surfactant (on silicone) | 14.6 | 14.6 | 14.6 | 14.6 | 14.6 | 14.6 |

-continued

| | Example | | | | | |
|---|---|---|---|---|---|---|
| | 1 | 2 | 3 | 4 | 5 | 6 |
| % Surfactant (on solution) | 6.0 | 4.8 | 6.0 | 4.8 | 6.0 | 4.8 |
| % NVM | 50.0 | 40.0 | 50.0 | 40.0 | 50.0 | 40.0 |
| HLB | 15.4 | | 16.1 | | 15.6 | |
| Centrifuge 1 hr@1000 rpm | Pass | Pass | Pass | Pass | Pass | Pass |
| Centrifuge 1 hr@2000 rpm | Pass | Pass | Pass | Pass | Pass | Pass |
| Appearance after 16 hrs @50° C. | Pass | Pass | Pass | Pass | Pass | Pass |
| 5 freeze thaw cycles (20° F./70° F.) | Pass | Pass | Pass | Pass | Pass[1] | Pass[1] |
| Particle size (nm) - init | 156 | | 156 | | 271 | |
| Particle size after 5 FT cycles | 152 | 153 | 154 | 154 | 261 | 264 |
| RT Storage (~70° F.) | | | | | | |
| 1 week | Pass | Pass | Pass | Pass | Pass | Pass |
| 2 weeks | Pass | Pass | Pass | Pass | Pass | Pass |
| 1 month | Pass | Pass | Pass | Pass | Pass[1] | Pass[1] |
| 2 months | Pass | Pass | Pass | Pass | Pass | Pass |
| 3 months | Pass | Pass | Pass | Pass | Pass | Pass |

[1]Settling noted

All the emulsions were satisfactory, and showed excellent freeze-thaw stability. The emulsions prepared from ARLY-PON® IT-16 had a considerably larger particle size, and although exhibiting no sedimentation after centrifuging, did exhibit some settling after one month storage.

In the present invention, each component may be present as a single component or as a plurality of components. The inventive emulsions require at least one epoxy- and organo-substituted organopolysiloxane, an emulsifier and/or dispersing agent and water. Each further component, whether identified in the specification or not, is optional, and the inventive emulsions may be made with the presence of such ingredients, or may be free of such ingredients, including those unnamed. Preferably, the inventive emulsions consist of epoxy- and aryl-substituted organopolysiloxane, emulsifier and/or dispersing agent, and water, but may also consist essentially of these ingredients, being free of additional ingredients which may alter the curing characteristics or emulsion stability, for example.

By the term "storage stable" is meant that the composition is free of observable sedimentation or phase separation after storage for two weeks at room temperature, e.g. 20-25° C. The compositions are preferably storage stable in like manner for at least one month.

By "essentially non-reactive" it is meant that the epoxy group content for example measured in weight percent based on the weight of the epoxy- and aryl-substituted organopolysiloane decreases by less than 20% after storage at room temperature for two weeks, preferably less than 10%, and more preferably less than 5%. Preferably such decreases are not observed after one month storage, and most preferably, substantially no, or at least no measurable decrease in epoxy content is observed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A storage stable aqueous emulsion, comprising:
    a) at least one branched, epoxy- and organo-substituted organopolysiloxane bearing a plurality of silicon-carbon bonded epoxy-containing groups as a first dispersed phase;
    b) water as a continuous phase; and
    c) at least one emulsifier and/or dispersing solid in an amount sufficient to stably disperse a) into b) forming a storage stable oil-in-water emulsion, wherein the at least one branched epoxy and organo-substituted organopolysiloxane contains Si—C bonded aryl groups, Si—C bonded long chain alkyl groups, or both Si—C bonded aryl groups and long chain alkyl groups, wherein at least one aryl group is present, and is an arylalkyl group or alkaryl group.

2. The emulsion of claim 1, wherein the epoxy- and organo-substituted organopolysiloxane is comprised of M, D, T, and optionally Q units, of the formulae

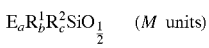   (M units)

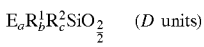   (D units)

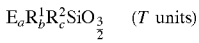   (T units)

   (Q units)

wherein
E is an epoxy-functional $C_{1-18}$ hydrocarbon group optionally containing one or more oxygen atoms, provided that no oxygen atom is directly bonded to an Si-atom; and
$R^1$ and $R^2$ are independently a $C_{1-20}$ hydrocarbon group, optionally interspersed with a heteroatom linking group
a is an integer of 0, 1, or 2;
b is an integer of 0, 1, 2 or 3;
c is an integer of 0, 1, 2 or 3; and
in M units, a+b+c=3,
in D units, a+b+c=2,
in T units, a+b+c=1,
with the proviso that the molecule, on average, contain at least two E components, and at least two of $R^1$ or $R^2$ are aryl groups or long chain alkyl groups.

3. The emulsion of claim 1, wherein the epoxy- and organo-substituted organopolysiloxane has a weight average molecular weight in the range of 400 to 15,000 g/mol.

4. The emulsion of claim 1, wherein the epoxy- and organo-substituted organopolysiloxane has an epoxy equivalent weight of from 150 to 1000 g polymer/mol of epoxy groups.

5. The emulsion of claim 1, wherein the epoxy- and organo-substituted organopolysiloxane has an epoxy equivalent weight of from 200 to 800 g polymer/mol of epoxy groups.

6. The emulsion of claim 1, wherein the emulsifier comprises at least one non-ionic surfactant.

7. The emulsion of claim 1, wherein the dispersing solid comprises a partly water-wettable metal oxide, a mixture of hydrophilic and hydrophobic metal oxides, or a mixture thereof.

8. The emulsion of claim 6, wherein the emulsion further comprises a partly water-wettable metal oxide, a mixture of hydrophilic and hydrophobic metal oxides, or a mixture thereof.

9. The emulsion of claim 1, wherein the sum of [a) +c)] is from 30 to 60 weight percent based on the sum of [a) +b) +c)].

10. An adhesive, paint, coating, or binder comprising an aqueous emulsion of claim 1 and an amount of hardener, catalyst, or both hardener and catalyst, which is effective to cure the epoxy- and organo-substituted organopolysiloxane into a solid.

11. The aqueous emulsion of claim 1, wherein the dispersed phase further comprises one or more ingredients selected from the group consisting of dyes, fillers, pigments, plasticizers and organic solvents.

12. The aqueous emulsion of claim 1, further comprising a second dispersed phase of solid polymer particles, the solid polymer particles being substantially unreactive with epoxy groups of the epoxy- and organo-substituted organopolysiloxane in said aqueous emulsion at room temperature.

13. A storage stable aqueous emulsion, comprising:
a) at least one branched, epoxy- and organo-substituted organopolysiloxane bearing a plurality of silicon-carbon bonded epoxy-containing groups as a first dispersed phase;
b) water as a continuous phase; and
c) at least one emulsifier and/or dispersing solid in an amount sufficient to stably disperse a) into b) forming a storage stable oil-in-water emulsion, wherein the epoxy- and organo-substituted organopolysiloxane is comprised of M, D, T, and optionally Q units, of the formulae

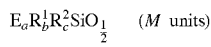 (M units)

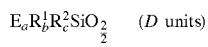 (D units)

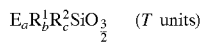 (T units)

 (Q units)

wherein

E is an epoxy-functional $C_{i-g}$ hydrocarbon group optionally containing one or more oxygen atoms, provided that no oxygen atom is directly bonded to an Si-atom; and $R^1$ and $R^2$ are independently a $C_{1-20}$ hydrocarbon group, optionally interspersed with a heteroatom linking group a is an integer of 0, 1, or 2;
b is an integer of 0, 1, 2 or 3;
c is an integer of 0, 1, 2 or 3; and
in M units, a+b+c=3,
in D units, a+b+c=2,
in T units, a+b+c=1,
with the proviso that the molecule, on average, contains at least two E components, and at least two of $R^1$ or $R^2$ are aryl groups or long chain alkyl groups, wherein heteroatom linking groups are present, and the heteroatom linking groups are independently selected from the group consisting of

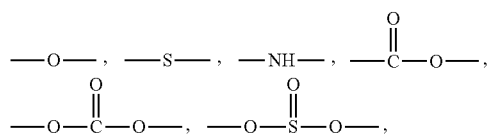

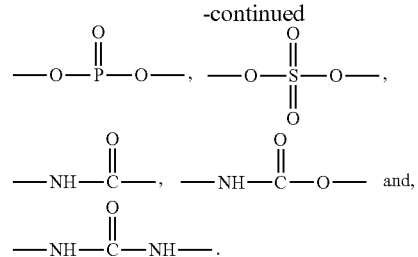

14. A storage stable aqueous emulsion, comprising:
a) at least one branched, epoxy- and organo-substituted organopolysiloxane bearing a plurality of silicon-carbon bonded epoxy-containing groups as a first dispersed phase;
b) water as a continuous phase; and
c) at least one emulsifier and/or dispersing solid in an amount sufficient to stably disperse a) into b) forming a storage stable oil-in-water emulsion, wherein the epoxy and organo-substituted organopolysiloxane has the formula

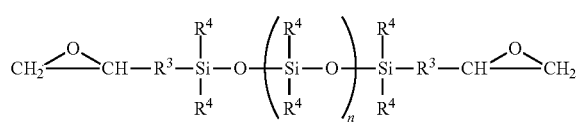 (I)

where $R^3$ are SiC-bonded ($C_1$-$C_{18}$) alkylene groups, optionally interspersed with oxygen and arylene groups; $R^4$ are independently selected from the group consisting of: alkyl, aryl, vinyl, glycol, ($C_i$-$C_8$) alkoxy, and epoxy; with n being greater than or equal to 1, and with the provisos that at least two of $R^4$ are aryl or long chain alkyl groups, and at least one $R^4$ constitutes a branching site which is an organosiloxy or polyorganosiloxy group.

15. A storage stable aqueous emulsion, comprising:
a) at least one branched, epoxy- and organo-substituted organopolysiloxane bearing a plurality of silicon-carbon bonded epoxy-containing groups as a first dispersed phase;
b) water as a continuous phase; and
c) at least one emulsifier and/or dispersing solid in an amount sufficient to stably disperse a) into b) forming a storage stable oil-in-water emulsion, which is basic, and which retains its epoxy group content during storage.

16. The aqueous emulsion of claim 15, which has a pH of from 8 to 9.

17. A storage stable aqueous emulsion, comprising:
a) at least one branched, epoxy- and organo-substituted organopolysiloxane bearing a plurality of silicon-carbon bonded epoxy-containing groups as a first dispersed phase;
b) water as a continuous phase; and
c) at least one emulsifier and/or dispersing solid in an amount sufficient to stably disperse a) into b) forming a storage stable oil-in-water emulsion wherein the epoxy- and organo-substituted organopolysiloxane is comprised of M, D, T, and optionally Q units, of the formulae

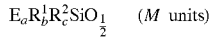 (M units)

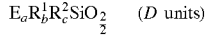 (D units)

-continued $E_aR^1_bR^2_cSiO_{\frac{3}{2}}$ (T units)

$SiO_{\frac{4}{2}}$ (Q units)

wherein
E is an epoxy-functional $C_{1-18}$ hydrocarbon group optionally containing one or more oxygen atoms, provided that no oxygen atom is directly bonded to an Si-atom; and
$R^1$ and $R^2$ are independently a $C_{1-20}$ hydrocarbon group, optionally interspersed with a heteroatom linking group
a is an integer of 0, 1, or 2;
b is an integer of 0, 1, 2 or 3;
c is an integer of 0, 1, 2 or 3; and
in M units, a+b+c=3,
in D units, a+b+c=2,
in T units, a+b+c=1,
with the proviso that the molecule, on average, contain at least two E components, and at least two of $R^1$ or $R^2$ are aryl groups or long chain alkyl groups, and wherein the mol % of T groups is from 5 to 20 mol percent, and the mol % of Q groups is less than 5 mol %, both mol percentages relative to the total number of M, D, T, and Q groups, and
where at least 1 of $R^1$ or $R^2$ is an aryl group.

18. The aqueous emulsion of claim 17, wherein the epoxy- and organo-substituted organopolysiloxane has a mol percent of T groups of from 5 to 15 mol percent, and no Q groups.

* * * * *